United States Patent
Mun et al.

(10) Patent No.: US 10,164,254 B2
(45) Date of Patent: Dec. 25, 2018

(54) COMPOSITE FOR ANODE ACTIVE MATERIAL, ANODE INCLUDING THE COMPOSITE, LITHIUM SECONDARY BATTERY INCLUDING THE ANODE, AND METHOD OF PREPARING THE COMPOSITE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Jinsoo Mun, Seoul (KR); Gyusung Kim, Suwon-si (KR); Heechul Jung, Gunpo-si (KR); Junho Park, Seoul (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 247 days.

(21) Appl. No.: 15/172,259

(22) Filed: Jun. 3, 2016

(65) Prior Publication Data
US 2016/0365572 A1 Dec. 15, 2016

(30) Foreign Application Priority Data
Jun. 9, 2015 (KR) .................. 10-2015-0081504

(51) Int. Cl.
| H01M 4/00 | (2006.01) |
| H01M 4/13 | (2010.01) |
| H01M 4/42 | (2006.01) |
| H01M 4/58 | (2010.01) |
| H01M 4/82 | (2006.01) |

(Continued)

(52) U.S. Cl.
CPC .......... H01M 4/366 (2013.01); H01M 4/386 (2013.01); H01M 4/624 (2013.01); H01M 4/628 (2013.01); H01M 10/0525 (2013.01); H01M 2004/027 (2013.01)

(58) Field of Classification Search
None
See application file for complete search history.

(56) References Cited

U.S. PATENT DOCUMENTS

| 2004/0099526 A1 | 5/2004 | Ito et al. |
| 2013/0143119 A1* | 6/2013 | Mah ................ H01M 4/58 429/220 |

(Continued)

FOREIGN PATENT DOCUMENTS

| JP | 2003-229179 A | 8/2003 |
| JP | 2008-258030 A | 10/2008 |

OTHER PUBLICATIONS

Li et al., "LiF/Fe nanocomposite as a lithium-rich and high capacity conversion cathode material for Li-ion batteries", Jun. 2012, Journal of Power Sources 217, pp. 54-58.*

(Continued)

Primary Examiner — Olatunji A Godo
Assistant Examiner — Julian Anthony
(74) Attorney, Agent, or Firm — Cantor Colburn LLP

(57) ABSTRACT

A composite anode active material includes: a silicon anode active material, a metal nitride; and a metal fluoride, wherein the metal nitride and the metal fluoride are each independently disposed on at least one surface of the silicon anode active material.

23 Claims, 14 Drawing Sheets

(51) Int. Cl.
  *H01M 6/00* (2006.01)
  *H01M 4/36* (2006.01)
  *H01M 4/38* (2006.01)
  *H01M 10/0525* (2010.01)
  *H01M 4/62* (2006.01)
  *H01M 4/02* (2006.01)

(56) References Cited

U.S. PATENT DOCUMENTS

2015/0180023 A1* 6/2015 Xiao ............... H01M 4/366
                                                      429/231
2015/0380733 A1* 12/2015 Lee ............... H01M 4/0471
                                                      429/219

OTHER PUBLICATIONS

Ryu et al., "Failure Modes of Silicon Powder Negative Electrode in Lithium Secondary batteries", Electrochemical and Solid-State Letters, vol. 7 (10), 2004, pp. A306-A309.

* cited by examiner

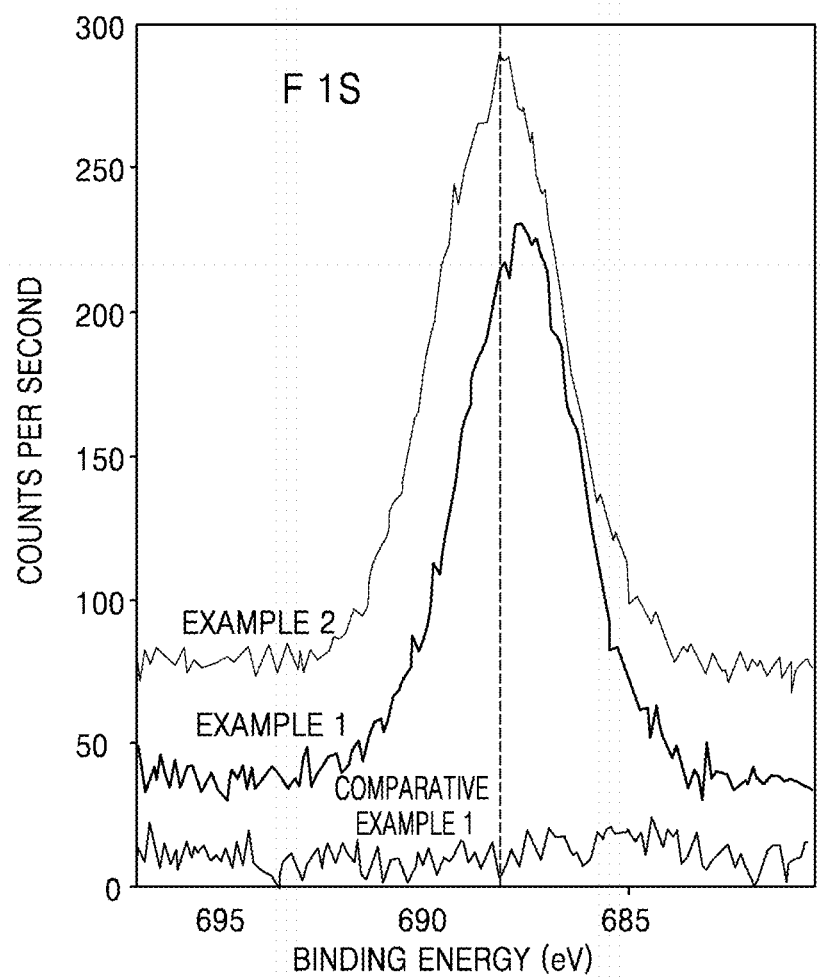

COMPOSITE FOR ANODE ACTIVE MATERIAL, ANODE INCLUDING THE COMPOSITE, LITHIUM SECONDARY BATTERY INCLUDING THE ANODE, AND METHOD OF PREPARING THE COMPOSITE

CROSS-REFERENCE TO RELATED APPLICATION

This application claims priority to and the benefit of Korean Patent Application No. 10-2015-0081504, filed on Jun. 9, 2015, in the Korean Intellectual Property Office, and all the benefits accruing therefrom under 35 U.S.C. § 119, the content of which in its entirety is herein incorporated by reference.

BACKGROUND

1. Field

The present disclosure relates to a composite anode active material, an anode including the composite, a lithium secondary battery including the anode, and a method of preparing the composite.

2. Description of the Related Art

In general, graphite has a specific capacity of about 360 milliampere-hours per gram (mAh/g), while silicon has a specific capacity of about 3600 mAh/g, which is about 10 times greater than that of graphite. Thus, there is potential for silicon as a next generation anode active material. Nevertheless, there is a need for improved lithium secondary batteries including silicon as an anode active material.

SUMMARY

Provided is a composite anode active material including a silicon-based anode active material, a metal nitride, and a metal fluoride.

Provided is an anode including the composite anode active material.

Provided is a lithium secondary battery including the anode.

Provided are methods of preparing the composite anode active material.

Additional aspects will be set forth in part in the description which follows and, in part, will be apparent from the description, or may be learned by practice of the presented embodiments.

According to an aspect of an embodiment, a composite anode active material includes a silicon anode active material including silicon, a metal nitride, and a metal fluoride, wherein the metal nitride and the metal fluoride are each independently disposed on at least one surface of the silicon anode active material.

The silicon-based anode active material may include a metal silicide core which includes a metal silicide and a silicon shell which includes silicon.

The metal nitride and the metal silicide may include the same metal.

A content of the metal nitride in the composite anode active material may be 0.5 mole or less, based on 1 mole of silicon contained in the silicon shell.

A content of the metal silicide in the composite anode active material may be 0.5 mole or less, based on 1 mole of silicon contained in the silicon shell.

The metal silicide may be $TiSi_x$, wherein $0<x\leq2$.

The silicon-based anode active material may include a silicon core without a shell, wherein the silicon core includes silicon.

A content of the metal nitride in the composite anode active material may be 0.5 mole or less, based on 1 mole of silicon contained in the silicon core.

The metal nitride and the metal silicide may each independently include Ti, V, Cu, Zn, Mo, Ni, Al, Ca, Mg, Fe, Cr, an alloy of at least two thereof, or a combination thereof.

The metal nitride may be $TiO_xN_y$, wherein $0\leq x<1$ and $y=1-x$.

The metal fluoride may include Al, Li, Sb, Ba, Bi, B, Ca, Co, Cu, Ge, Fe, La, Mg, Mn, Mo, Ni, Si, Ag, Na, Sr, Sn, Ti, W, Y, Zn, Zr, an alloy of at least two thereof, or a combination thereof.

The metal fluoride may be $AlF_xO_y$, wherein $0<x\leq3$ and $y=3-x$, $LiF_xO_y$, wherein $0<x\leq1$ and $y=1-x$, or a combination thereof.

A content of the metal fluoride may be in the range of about 1 to about 70 parts by weight, based on 100 parts by weight of a total weight of the composite anode active material.

According to an aspect of another embodiment, an anode includes the composite anode active material.

The anode may further include an additional anode active material.

According to an aspect of another embodiment, a lithium secondary battery includes the anode.

According to an aspect of another embodiment, a method of preparing a composite anode active material includes: milling a metal silicide, heat-treating the milled metal silicide in a nitrogen atmosphere to form a heat-treated metal silicide comprising a metal nitride on a surface thereof, and contacting the heat-treated metal silicide with a metal fluoride to dispose the metal fluoride on a surface of the heat-treated metal silicide and to form a coating comprising the metal fluoride on the surface of the heat-treated metal silicide to prepare the composite anode active material.

According to an aspect of another embodiment, a method of preparing a composite anode active material includes: contacting a core including silicon and a metal nitride to form a coating of the metal nitride on a surface of the core to form a surface-treated core; and contacting the surface-treated core with a metal fluoride to dispose the metal fluoride on the surface-treated core to prepare the composite anode active material, wherein the metal nitride and the metal fluoride are each independently disposed on a surface of the core.

BRIEF DESCRIPTION OF THE DRAWINGS

These and/or other aspects will become apparent and more readily appreciated from the following description of the embodiments, taken in conjunction with the accompanying drawings in which:

FIG. 11B is a graph of counts per second versus binding energy (eV) showing F1s spectra of composite anode active materials prepared or used in Examples 1 and 2 and Comparative Example 1 and obtained by XPS.

DETAILED DESCRIPTION

Figure 1:
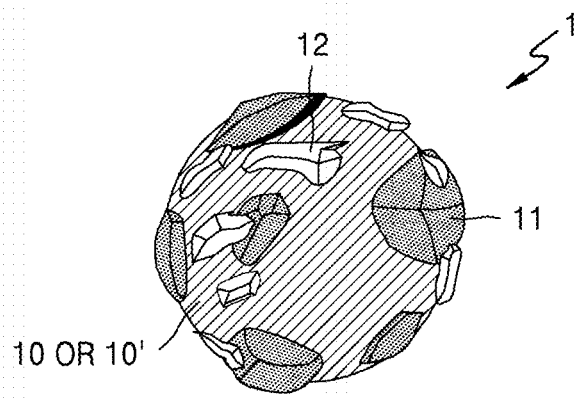
FIG. 1 is a schematic diagram of a composite anode active material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite anode active material, a method of preparing the same, an anode, and a lithium secondary battery according to an embodiment will be described in detail with reference to the accompanying drawings.

As used herein, the term "composite" refers to a material made from two or more constituent materials with significantly different physical or chemical properties that, when combined, produce a material having characteristics which are different from the characteristics of the individual components. The individual components remain separate and distinct within a finished structure of the composite at the macro- or micro-scale levels.

FIG. 1 is a schematic diagram of a composite anode active material 1 according to an embodiment.

The composite anode active material 1 according to an embodiment includes a silicon-based anode active material having a core-shell structure 10 or a single structure 10', a metal nitride (MN) 11, and a metal fluoride (MF) 12. The metal nitride 11 and the metal fluoride 12 are each independently disposed on at least one surface of the silicon anode active material having a core-shell structure 10 or a single structure 10'.

Hereinafter, constituent components of the composite anode active material 1 will be described in the following order.

Silicon-Based Anode Active Material

The silicon-based anode active material having a core-shell structure 10 or a single structure 10' allows intercalation and deintercalation of lithium ions.

The silicon-based anode active material may have a core-shell structure 10 or a single structure 10'. For example, the silicon-based anode active material having a single structure 10' may be a core material without a shell. Hereinafter, these structures will be sequentially described.

Silicon-Based Anode Active Material Having Core-Shell Structure 10

Figure 2A:
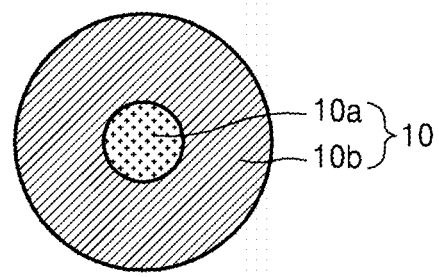
FIG. 2A is a diagram of a silicon anode active material having a core-shell structure and included in the composite of FIG. 1.

FIG. 2A is a diagram of a silicon-based anode active material having a core-shell structure 10 and included in the composite anode active material 1 as shown in FIG. 1.

Referring to FIG. 2A, the silicon-based anode active material having a core-shell structure 10 may include a metal silicide core 10a including a metal silicide, and a silicon shell 10b including silicon.

As used herein, the terms "core" and "shell" refer to not only a case in which the silicon shell 10b completely surrounds the metal silicide core 10a, but also a case in which the silicon shell 10b partially surrounds the metal silicide core 10a.

The metal silicide core 10a may include Ti, V, Cu, Zn, Mo, Ni, Al, Ca, Mg, Fe, Cr, an alloy of at least two thereof, or a combination thereof.

The metal silicide core 10a may include the same metal as that used in the metal nitride.

For example, the metal silicide core 10a may include $CaSi_2$, $Mg_2Si$, $Cu_3Si$, NiSi, FeSi, or a combination thereof.

The metal silicide core 10a may be $TiSi_x$, where $0<x\leq2$.

Particles of the metal silicide core 10a may be nanoparticles or microparticles. The nanoparticles of the metal silicide core 10a may have an average particle diameter of about 10 nanometers (nm) to about 500 nm, about 20 nm to about 400 nm, or about 40 nm to about 300 nm, and the microparticles of the metal silicide core 10a may have an average particle diameter of about 100 nm to about 1 micrometer (μm), or about 0.2 μm to about 0.9 μm, or about 0.3 μm to about 0.8 μm. The particle diameter may be determined by light scattering.

The composite anode active material 1 may further be treated using a selective etchant.

When the composite anode active material 1 is treated with the selective etchant, the metal silicide core 10a may be selectively etched to form pores within the metal silicide core 10a. The selective etchant may include a buffered oxide etchant (BOE), HF, HCl, NaOH, or a combination thereof.

The process of treating the composite anode active material using the selective etchant may be performed until the metal silicide core 10a is completely etched. In this case, a heat treatment may be performed at a temperature of about 800° C. to about 1200° C.

Thus, the metal silicide core 10a may be porous. In this case, the metal silicide 10a may have a porosity of about 1% to about 10%, or about 1% to about 9%, or about 2% to about 8%.

In general the lifespan of lithium secondary batteries including silicon rapidly decreases due to pulverization of silicon and the continuous formation of solid electrolyte interface (SEI) layers caused by repeated volume expansion and shrinkage during charging and discharging of the battery. Without being limited by theory, it is believed that the metal silicide core 10a, which is disposed at the center of a particle of the composite anode active material 1, physically binds to particles of the silicon shell 10b and serves as a buffer relieving internal stress generated during volume expansion. Thus, since the metal silicide core 10a prevents pulverization of the particles of the silicon shell 10b and pores in the metal silicide core 10a provide free space capable of accommodating the volume expansion of the particles of the silicon shell 10b, deterioration of an electrode, caused by volume expansion of the silicon shell 10b, may be reduced.

A content of the metal nitride in the composite anode active material may be about 0.5 mole (mol) or less, for example, in the range of about 0.01 to about 0.5 mol, or about 0.02 to about 0.4 mol, or about 0.05 to about 0.1 mol, based on 1 mol of silicon contained in the shell.

A content of the metal silicide in the composite anode active material may be about 0.5 mol or less, for example, in the range of about 0.01 to about 0.5 mol, or about 0.02 to about 0.4 mol, or about 0.05 to about 0.1 mol, based on 1 mol of silicon contained in the shell.

Silicon-Based Anode Active Material Having Single Structure 10'

Figure 2B:
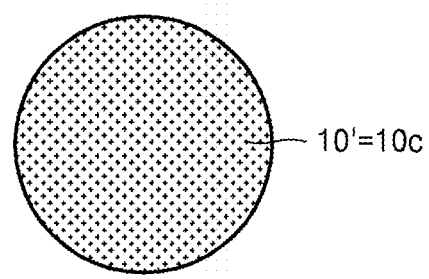
FIG. 2B is a diagram of a silicon-based anode active material having a core without a shell and included in the composite of FIG. 1.

FIG. 2B is a diagram of a silicon-based anode active material having a single structure 10' and which may be included in the composite anode active material 1 of FIG. 1.

Referring to FIG. 2B, the silicon-based anode active material having a single structure 10' may include only a core including silicon 10c with no shell. In this case, a content of the metal nitride 11 in the composite active anode material may be 0.5 mol or less, for example, in the range of 0.01 to 0.5 mol, or about 0.02 to about 0.4 mol, or about 0.05 to about 0.1 mol, based on 1 mol of silicon contained in the core.

Metal nitride 11 and Metal Fluoride 12

The metal nitride 11 is electrochemically stable and has satisfactory electrical conductivity.

The metal fluoride 12 is chemically stable. Thus, the metal fluoride 12 may further stabilize the surface of the composite anode active material 1.

The metal nitride 11 and the metal fluoride 12 are each independently disposed on at least one surface of the silicon-based anode active material having a core-shell structure 10 or a single structure 10'. The metal nitride 11 and the metal fluoride 12 form a coating layer on the at least one surface of the silicon-based anode active material, where the coating layer is an inactive coating layer with respect to lithium and suppresses reaction between silicon and an electrolyte resulting in reduced formation of solid electrolyte interface (SEI) layers that irreversibly consume lithium. The metal nitride 11 and the metal fluoride 12 also form an electrically conductive pathway on the silicon, and as a result, electrochemical properties and lifespan of the both the anode and the lithium secondary battery, may be improved.

Each of the metal nitride 11 and the metal fluoride 12 may be disposed on the surface of the silicon shell 10b or the core including silicon 10c as a uniform coating layer or in the form of islands. Also, at least a portion of particles of the metal nitride 11 and the metal fluoride 12 may be buried in the silicon shell 10b or the core including silicon 10c.

The metal nitride 11 and the metal fluoride 12 may each independently have a thickness of about 1 to about 200 nm. When the thicknesses of the metal nitride 11 and the metal fluoride 12 are within this range, side reactions between silicon and the electrolyte may be suppressed and the anode may have improved electrochemical properties and high durability. For example, the thicknesses of the metal nitride 11 and the metal fluoride 12 may each independently be in the range of about 30 to about 200 nm, or about 40 to about 150 nm.

The metal nitride 11 may include Ti, V, Cu, Zn, Mo, Ni, Al, Ca, Mg, Fe, Cr, an alloy of at least two thereof, or a combination thereof.

For example, the metal nitride 11 may include $TiO_xN_y$, where $0 \leq x < 1$ and $y=1-x$, $CrO_xN_y$ where $0 \leq x < 1$ and $y=1-x$, or a combination thereof.

The metal fluoride 12 may include Al, Li, Sb, Ba, Bi, B, Ca, Co, Cu, Ge, Fe, La, Mg, Mn, Mo, Ni, Si, Ag, Na, Sr, Sn, Ti, W, Y, Zn, Zr, an alloy of at least two thereof, or a combination thereof.

The metal fluoride 12 may include $AlF_xO_y$ where $0 < x \leq 3$ and $y=3-x$, $LiF_xO_y$ where $0 < x \leq 1$ and $y=1-x$, or a combination thereof.

A content of the metal fluoride 12 in the composite anode active material may be in the range of about 1 to about 70 parts by weight based on 100 parts by weight of a total weight of the composite anode active material 1. When the content of the metal fluoride 12 is within this range, an anode with high durability may be prepared without lowering the electrochemical properties. For example, the content of the metal fluoride 12 may be in the range of about 1 to about 75 parts by weight, or about 1 to about 50 parts by weight based on 100 parts by weight of the total weight of the composite anode active material 1.

Hereinafter, a method of preparing a composite anode active material, according to an embodiment, will be described in detail.

Figure 3A:
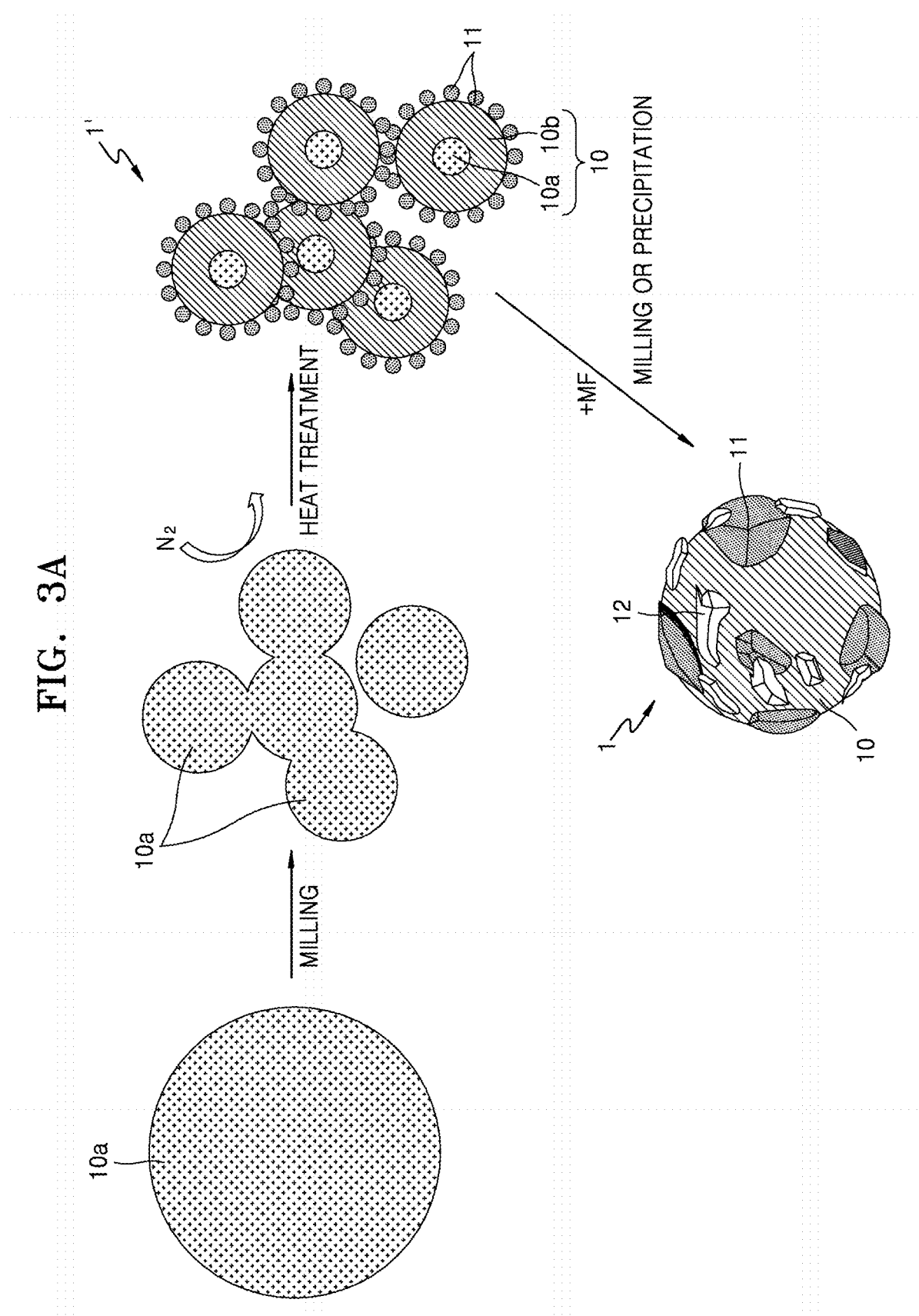
FIG. 3A is a diagram describing a method of preparing a composite anode active material, according to an embodiment.

FIG. 3A is a diagram describing a method of preparing the composite anode active material 1, according to an embodiment.

Referring to FIG. 3A, the method of preparing the composite anode active material 1 includes milling the metal silicide core 10a, heat-treating the milled metal silicide core 10a in a nitrogen atmosphere to form a heat-treated metal silicide including a metal nitride 11 on a surface thereof, and contacting the heat-treated resultant 1' with a metal fluoride to dispose the metal fluoride 12 on the surface of the heat-treated metal silicide and to form a coating including the metal fluoride 12 on the surface of the heat-treated metal silicide.

The milling may be performed for a time of about 0.5 to about 12 hours. When the milling is performed within this time range, a phase separation of the metal silicide core 10a into the silicon shell 10b and the metal nitride 11 may be quickly performed. Devices used for the milling are not particularly limited, and any suitable milling device known in the art may be used. For example, a Spex mill, planetary mills, and the like may be used.

The heat-treating may be performed in a nitrogen atmosphere at a temperature of about 800 to about 1200° C., for example, about 900 to about 1150° C., or about 1050 to about 1150° C. For example, the heat-treating may be performed for about 0.5 to about 5 hours, although a heat-treatment time may vary according to a heat-treatment temperature. The metal silicide core 10a is phase-separated into the silicon shell 10b and the metal nitride 11 through the heat-treatment process, thereby producing the resultant 1' including a metal silicide core 10a, a silicon shell 10b including silicon, and a metal nitride 11 dispersed on the surface of the silicon shell 10b. As shown in FIG. 3A, the metal nitride and the metal fluoride are each independently disposed on a surface of the core.

The surface-treating may be performed by milling or precipitation. The milling may be performed by mixing the heat-treated resultant 1' with the metal fluoride 12 and milling the mixture. The same device used in the milling of the metal silicide 10a may be used. The precipitation may be performed by immersing the heat-treated resultant 1' in a precursor solution including the metal fluoride 12 while stirring to obtain a slurry, and subsequently removing a solvent from the slurry.

Figure 3B:
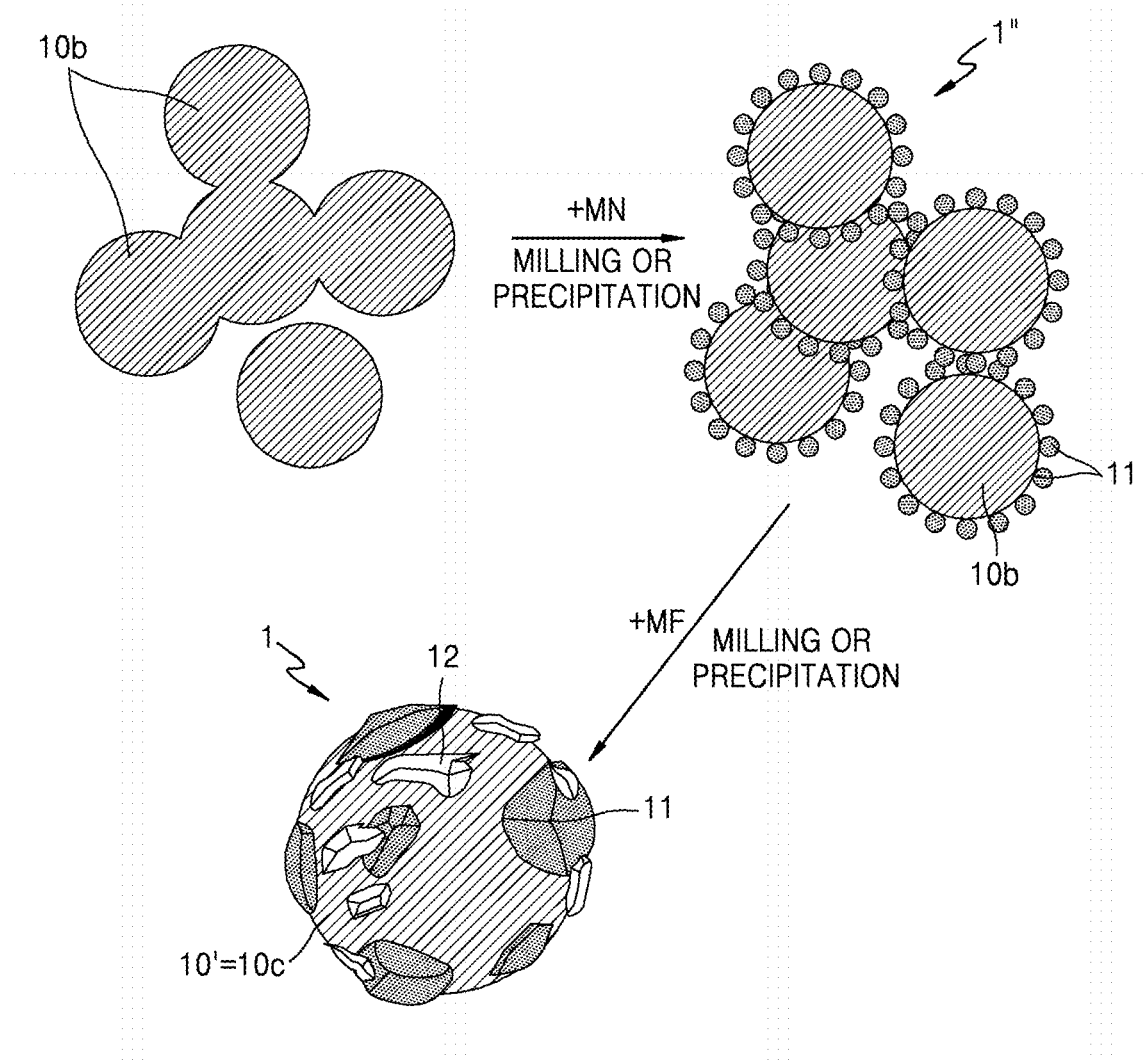
FIG. 3B is a diagram describing a method of preparing a composite anode active material according to another embodiment.

FIG. 3B is a diagram describing a method of preparing the composite anode active material 1, according to another embodiment.

Referring to FIG. 3B, the method of preparing the composite anode active material includes surface-treating a core including silicon 10c to coat the metal nitride (MN) 11 on the surface thereof, and further surface-treating the surface-treated silicon 1" to coat the metal fluoride (MF) 12 on the surface thereof.

Each of the contacting processes (e.g. surface treating process) may be performed by milling or precipitation. The milling may be performed by mixing the core containing silicon 10c with the metal nitride (MN) 11 or mixing the surface-treated silicon 1" with the metal fluoride (MF) 12, and milling the mixture using the same device and method as those used in the milling of the metal silicide 10a as described above with reference to FIG. 3A. The precipitation may be performed by immersing the silicon 10c in a precursor solution of the metal nitride 11 while stirring to obtain a slurry or by immersing the surface-treated silicon 1" in a precursor solution of the metal fluoride 12 while stirring to obtain a slurry, and removing a solvent from the slurries.

The milling in each process may also be performed by wet milling using a medium, in addition to the dry milling process that is described above.

Before each of the milling processes, sonication or stirring may further be performed by adding at least one of the metal silicide core 10a, the silicon shell 10b, the core containing silicon 10c, the metal nitride (MN) 11, the metal fluoride (MF) 12, and the heat-treated resultant 1', or the surface-treated silicon 1" to a medium. The milling processes may be performed after removing the medium once the sonication or stirring is completed. Through the process of sonication or stirring, dispersion of the metal nitride 11 and the metal fluoride 12 may further be improved in the composite anode active material 1.

The medium may include alcohol (e.g., ethanol), acetone, water, N-methyl-2-pyrrolidone (NMP), toluene, tetrahydrofuran (THF), hexane, or a combination thereof.

In addition, it may be confirmed that the composite anode active material 1 includes Si, TiN, and TiSi$_2$ phases by X-ray diffraction analysis.

The existence of the Si phase may be confirmed by peaks observed at regions where the diffraction angle two-theta (2θ) degrees is in the range of about 28 to about 29°, about 43 to about 44° and about 56 to about 57°, and the existence of the TiN phase may be confirmed by peaks observed at regions where the diffraction angle 2θ degrees is in the range of about 36 to about 37° about 41 to about 42° and about 61 to about 62°. The existence of the TiSi$_2$ phase may be confirmed by a peak observed at a region where diffraction angle 2θ degrees is in the range of about 38 to about 39°.

In addition, the existence of the metal fluoride 12 (e.g., lithium fluoride) contained in the composite anode active material 1 may be confirmed by Energy Dispersive X-ray Spectroscopy (EDS) mapping images and X-ray photoelectron spectroscopy (XPS).

Hereinafter, an anode according to an embodiment will be described in detail.

The anode includes the composite anode active material described above.

The anode may further include an additional anode active material commonly used in lithium secondary batteries in addition to the afore-mentioned composite anode active material.

The additional anode active material may be any suitable material that allows intercalation and deintercalation of lithium ions, for example, carbonaceous materials such as carbon nanotubes (CNT), carbon nanofibers, graphene, graphite, or carbon black; lithium metal; alloys of lithium metal; and silicon oxide-based materials.

The anode may further include a binder and/or a conductive agent in addition to the afore-mentioned composite anode active material and the additional anode active material.

The binder may assist binding of the constituent components of the anode, including the composite anode active material, the additional anode active material, and the conductive agent. The binder may also assist in binding of the anode to a current collector. Examples of the binder may include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene butadiene rubber, fluoride rubber, and various copolymers, or a combination thereof.

The binder may further include lithium ions.

A content of the binder may be in the range of about 1 to about 20 parts by weight, for example, about 2 to about 7 parts by weight based on 100 parts by weight of a total combined weight of the composite anode active material and the additional anode active material. When the content of the binder is within the above ranges (e.g. about 1 to about 20 parts by weight), adhesion of the anode to the current collector may increase.

The conductive agent may be any suitable conductive material that does not cause a chemical change in a lithium secondary battery including the conductive agent.

For example, the conductive agent may include at least one carbonaceous conductive agent selected from the group consisting of carbon black, carbon fiber, and graphite. The conductive agent may be the same as or different from that the additional anode active material. The carbon black may be selected from the group consisting of acetylene black, Ketjen black, super-P, channel black, furnace black, lamp black, and thermal black. The graphite may include natural graphite, artificial graphite, or a combination thereof.

The anode may further include an additional conductive agent in addition to the afore-mentioned carbonaceous conductive agent.

The additional conductive agent may include conductive fiber such as metal fiber; metal powder such as carbon fluoride powder, aluminum powder, and nickel powder; conductive whisker such as zinc oxide and potassium titanate; polyphenylene derivatives, or a combination thereof.

A content of the conductive agent may be in the range of about 0.01 to about 10 parts by weight, for example, about 0.5 to about 5 parts by weight, based on 100 parts by weight of the total combined weight of the composite anode active material and the additional anode active material. When the content of the conductive agent is within the above ranges (e.g. about 0.01 to about 10 parts by weight), the anode may have excellent ionic conductivity.

The anode may be prepared in the following manner.

First, the composite anode active material according to an embodiment, the additional anode active material, the binder, a solvent, the carbonaceous conductive agent, and/or the additional conductive agent are mixed together to prepare an anode active material layer-forming composition.

Then, the anode active material layer-forming composition is coated on an anode current collector and dried to prepare an anode.

In general, the anode current collector may have a thickness of about 3 to about 500 μm. The anode current collector may be any one of various current collectors having high conductivity without causing any undesirable chemical change in a lithium secondary battery including the same. For example, the anode current collector may include: copper; stainless steel; aluminum; nickel; titanium; heat-treated carbon; copper or stainless steel surface-treated with carbon, nickel, titanium, silver, or the like; or an aluminum-cadmium alloy. In addition, the anode current collector may have a surface on which fine irregularities are formed to enhance adhesion between the current collector and the anode active material. The surface irregularities may be formed in the same manner as for a cathode current collector, which will be described later. The anode current collector may be used in any of various forms including films, sheets, foils, nets, porous structures, foams, and non-woven fabrics.

Examples of the solvent may include N-methylpyrrolidone (NMP), acetone, water, or a mixture thereof. A content of the solvent may be in the range of about 1 to about 50 parts by weight based on 100 parts by weight of the anode active material. When the content of the solvent is within this range, a process of forming the anode active material layer may be efficiently performed.

A lithium secondary battery according to an embodiment includes the afore-mentioned anode.

Figure 4:
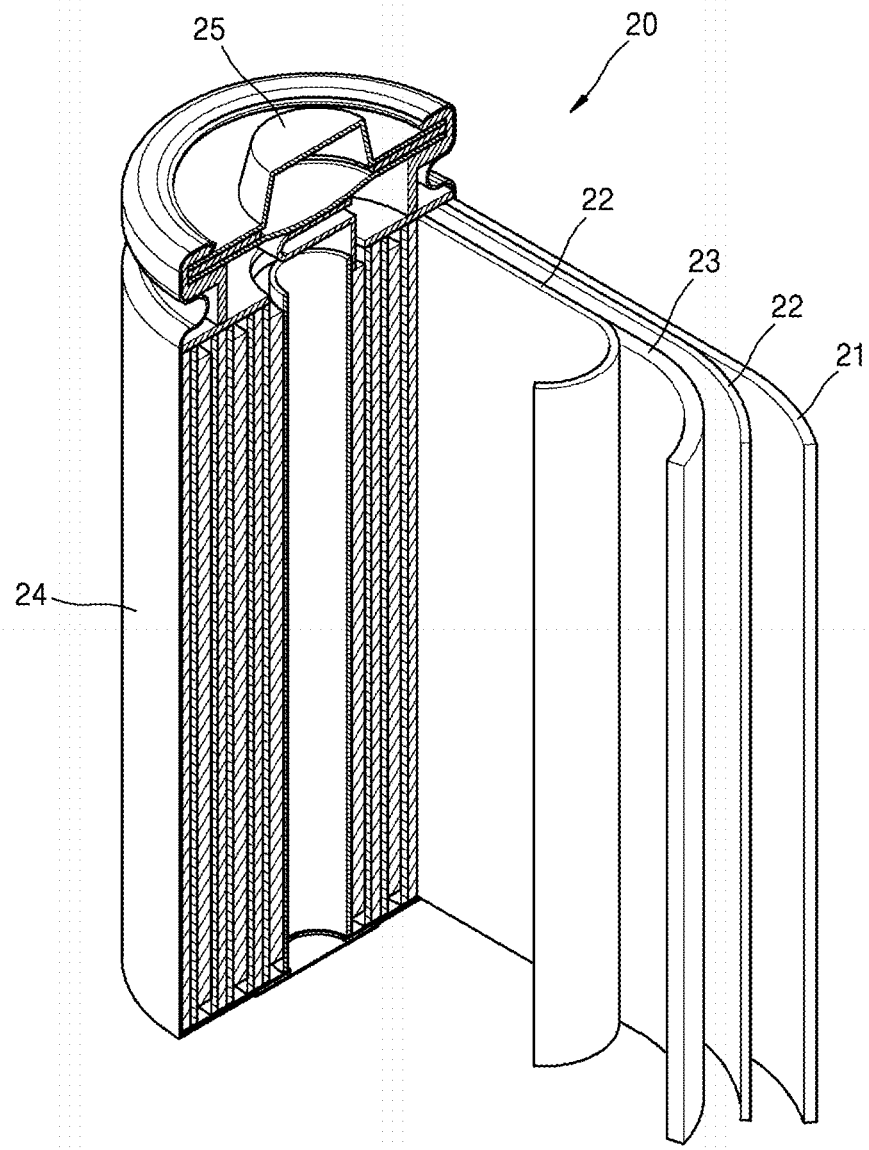
FIG. 4 is a schematic diagram of a lithium secondary battery according to an embodiment.

FIG. 4 is a schematic diagram of a lithium secondary battery 20 according to an embodiment.

Referring to FIG. 4, the lithium secondary battery 20 includes a cathode 23, an anode 21, and a separator 22.

The cathode 23, the anode 21, and the separator 22 are wound or folded, and then accommodated in a battery case 24. Then, an electrolyte (not shown) is injected into the battery case 24 and the battery case 24 is sealed by a cap assembly 25, thereby completing the manufacture of the lithium secondary battery 20. The battery case 24 may have a coin shape, a rectangular shape, or a thin-film shape. For example, the lithium secondary battery 20 may be a large-sized thin film battery.

The lithium secondary battery 20 has excellent initial charge and discharge efficiencies and lifespan characteristics.

Hereinafter, a method of preparing a lithium secondary battery, according to an embodiment, will be described in detail.

First, an anode is prepared according to the afore-mentioned method.

Then, a cathode is prepared in a similar method to that of the anode described above. For example, a lithium transition metal oxide, a binder, a conductive agent, and a solvent are mixed together to prepare a cathode active material layer-forming composition. Then, the cathode active material layer-forming composition is coated on a cathode current collector and dried to prepare a cathode.

The types and content of the binder, the conductive agent, and the solvent used in the cathode active material layer-forming composition may be the same as those used for the anode active material layer-forming composition.

The lithium transition metal oxide may include $LiCoO_2$, $LiNiO_2$, $LiMnO_2$, $LiMn_2O_4$, $Li(Ni_aCo_bMn_c)O_2$ where $0<a<1$, $0<b<1$, $0<c<1$, and $a+b+c=1$, $LiNi_{1-y}Co_yO_2$, $LiCo_{1-y}Mn_yO_2$, $LiNi_{1-y}Mn_yO_2$ where $0 \leq y<1$, $LiMn_{2-z}Ni_3O_4$, $LiMn_{2-z}Co_zO_4$ where $0<z<2$, $LiCoPO_4$, $LiFePO_4$, or a combination thereof.

The cathode current collector may have a thickness of about 3 to about 500 μm and may be any one of various suitable current collectors that have high conductivity and do not cause any chemical change in the lithium secondary battery including the cathode current collector. Examples of the cathode current collector may include stainless steel; aluminum; nickel; titanium; heat-treated carbon; or aluminum or stainless steel surface-treated with carbon, nickel, titanium, silver, or the like. The cathode current collector may have fine irregularities on the surface thereof to increase adhesion between the current collector and the cathode active material and may be used in any of various forms including films, sheets, foils, nets, porous structures, foams, and non-woven fabrics.

A separator is interposed between the cathode and the anode, which are prepared as described above, and an organic liquid electrolyte is injected thereinto, thereby completing the manufacture of a lithium secondary battery.

For example, the lithium secondary battery may be prepared by sequentially stacking the anode, the separator, and the cathode, winding or folding the stacked structure, accommodating the wound or folded structure in a battery case or pouch having a coin or rectangular shape, and injecting the organic liquid electrolyte into the battery case or pouch.

The separator may have a pore diameter of about 0.01 to about 10 μm and a thickness of about 5 to about 300 μm. Examples of the separator may include an olefin-based polymer such as polypropylene and polyethylene, or a sheet or non-woven fabric formed of glass fibers.

The organic liquid electrolyte may be prepared by dissolving a lithium salt in a medium.

The medium may include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, or a combination thereof.

The lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (x and y are each independently a natural number), LiCl, LiI, or a combination thereof.

A lithium secondary battery according to another embodiment may further include an organic solid electrolyte and/or an inorganic solid electrolyte in addition to the organic liquid electrolyte. When the organic solid electrolyte and/or the inorganic solid electrolyte are used, the solid electrolyte may also serve as a separator, and thus a separator may not be used.

Examples of the organic solid electrolyte may include polyethylene derivatives, polyethylene oxide derivatives, polypropylene oxide derivatives, phosphoric acid ester polymer, polyester sulfide, polyvinyl alcohol, and polyvinylidene fluoride.

Examples of the inorganic solid electrolyte may include a nitride, halide, or sulfide of Li such as $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

Hereinafter, one or more embodiments of the present disclosure will be described in detail with reference to the following examples. These examples are not intended to limit the purpose and scope of the one or more embodiments of the present disclosure.

EXAMPLES

Examples 1 to 5 and Comparative Example 1

Preparation of Composite Anode Active Material

Preparation of Composite Anode Active Material According to Examples 1 and 2

Titanium silicide powder ($TiSi_2$, LTS Chemical Inc.) was pulverized to titanium silicide particles having an average particle diameter of about 300 nm by milling for about 30 minutes using a mechanical mill (SPEX Mill). Then, the pulverized resultant was heat-treated in a nitrogen atmosphere at about 1,100° C. for 1 hour to obtain a precursor of a composite anode active material including titanium silicide ($TiSi_2$), silicon (Si), and titanium nitride (TiN). The precursor of the composite anode active material was added to an aqueous $Al(NO_3)_3$ solution while stirring. An $NH_3F$ solution (molar ratio of $NH_3F$:ethanol:water is 0.02:3.94:2.78) was added to the resultant dropwise while stirring. Then, the obtained resultant was heat-treated on a hot plate at 80° C. overnight while stirring to remove a solvent therefrom. As a result, a composite anode active material including titanium silicide ($TiSi_2$), silicon (Si), titanium nitride (TiN), and aluminum fluoride ($AlF_3$) was obtained. Contents of aluminum fluoride ($AlF_3$) and lithium fluoride (LiF) contained in the composite anode active material are listed in Table 1 below.

Preparation of Composite Anode Active Material According to Examples 3 to 5

Titanium silicide powder ($TiSi_2$, LTS Chemical Inc.) was pulverized to titanium silicide particles having an average particle diameter of about 300 nm by milling for about 30 minutes using a mechanical mill (SPEX Mill). Then, the pulverized resultant was heat-treated in a nitrogen atmosphere at about 1,100° C. for 1 hour to obtain a precursor of a composite anode active material including titanium silicide (TiSi$_2$), silicon (Si), and titanium nitride (TiN). Lithium fluoride (LiF) was added to the precursor of the composite anode active material, and the resultant mixture was milled using the mechanical mill (SPEX Mill) for about 8 minutes to obtain a TiSi$_2$/Si/TiN/LiF composite anode active material having an average particle diameter of about 10 μm. Content of aluminum fluoride (AlF$_3$) and lithium fluoride (LiF) contained in the composite anode active material are listed in Table 1 below.

Preparation of Composite Anode Active Material According to Comparative Example 1

Titanium silicide powder (TiSi$_2$, LTS Chemical Inc.) was pulverized to titanium silicide particles having an average particle diameter of about 300 nm by milling for about 30 minutes using a mechanical mill (SPEX Mill). Then, the pulverized resultant was heat-treated in a nitrogen atmosphere at about 1,100° C. for 1 hour to obtain a composite anode active material including titanium silicide (TiSi$_2$), silicon (Si), and titanium nitride (TiN).

In the composite anode active materials prepared according to Examples 1 to 5 and Comparative Example 1, content of the titanium nitride (TiN) and the titanium silicide (TiSi$_2$) were about 0.3 mol and about 0.2 mol based on 1 mol of silicon (Si), respectively.

In addition, contents of aluminum fluoride (AlF$_3$) and lithium fluoride (LiF) contained in the composite anode active material prepared according to Comparative Example 1 are listed in Table 1 below.

TABLE 1

|  | Example 1 | Example 2 | Example 3 | Example 4 | Example 5 | Comparative Example 1 |
|---|---|---|---|---|---|---|
| AlF$_3$ (wt %) | 1 | 2 | 0 | 0 | 0 | 0 |
| LiF (wt %) | 0 | 0 | 1 | 2 | 5 | 0 |

Preparation of Anode 85 parts by weight of each of the composite anode active materials, 5 parts by weight of a conductive agent (Ketjen black 300JD), and 10 parts by weight of a binder solution (4 volume percent (vol %) of lithium polyacrylate (Li-PAA) solution prepared by dissolving PAA (Aldrich) and Li ions in water) were mixed together to prepare an anode active material layer-forming composition. Then, the anode active material layer-forming compositions were respectively coated on a copper thin film, used as an anode current collector, to have a thickness of 100 μm, and the structure was primarily dried at 80° C., secondarily dried at 120° C. in a vacuum, and roll-pressed to prepare anodes.

Preparation of Coin Half Cell

Coin half cells (2032 type) were prepared by winding the anode to a cylindrical shape having a diameter of 12 mm and using lithium metal as a counter electrode. In this case, a 1.3 M LiPF$_6$ solution, prepared using a mixed solvent including ethylene carbonate, diethylene carbonate, and fluoroethylene carbonate in a weight ratio of 2:6:2, was used as an electrolyte.

Evaluation Examples

Evaluation Example 1

Evaluation of Charge/Discharge Characteristics

Charge/discharge characteristics of the coin half cells prepared according to Examples 1 to 5 and Comparative Example 1 were evaluated using a charger/discharger (TOYO-3100 manufactured by TOYO). Particularly, each of the coin half cells was charged at a C-rate of 0.1 C (mA/g) at room temperature (25° C.) at a first cycle (n=1) until a voltage reached 0.01 V and discharged at a C-rate of 0.1 C until the voltage reached 1.5 V. Then, the coin half cells were rested for 10 minutes. Then, at a second cycle (n=2), each of the coin half cells was charged at a C-rate of 0.5 C at room temperature (25° C.) until the voltage reached 0.01 V and discharged at a C-rate of 0.5 C until the voltage reached 1.5 V. Then, the coin half cells were rested for 10 minutes. At a third cycle and the following cycles (n≥3), each of the coin half cells was charged at a C-rate of 1.0 C at room temperature (25° C.) until the voltage reached 0.01 V and discharged at a C-rate of 1.0 C until the voltage reached 1.5 V. The charging and discharging cycles were repeatedly performed for 100 times (i.e., n=102). The "C-rate" refers to a discharge rate of a cell, obtained by dividing a total capacity of a cell by a total discharge time.

Evaluation of Voltage Profile

Figure 5:
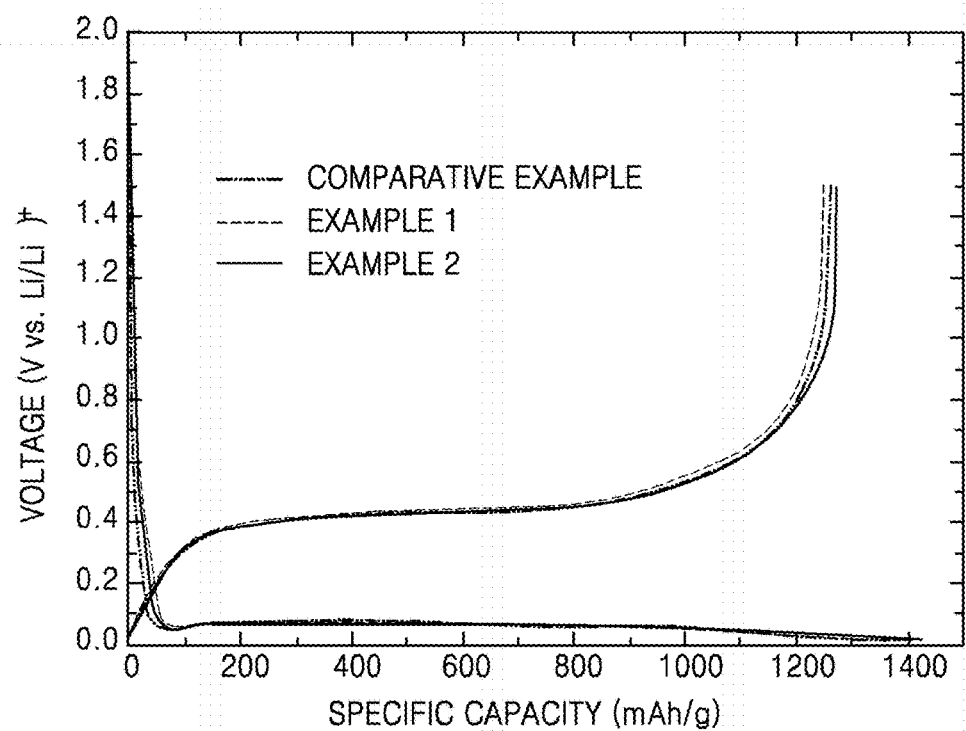
FIG. 5 is a graph of voltage (V) versus specific capacity (mAh/g) illustrating first charge/discharge curves for anodes prepared according to Examples 1 and 2 and Comparative Example 1.

FIG. 5 illustrates voltage profiles of the coin half cells prepared according to Examples 1 and 2 and Comparative Example 1 at the first cycle.

In addition, initial discharge capacities of the coin half cells prepared according to Examples 1 to 5 and Comparative Example 1 were measured, and the results are shown in Table 2 below.

Comparison of Cycle Lifespan

Figure 6:
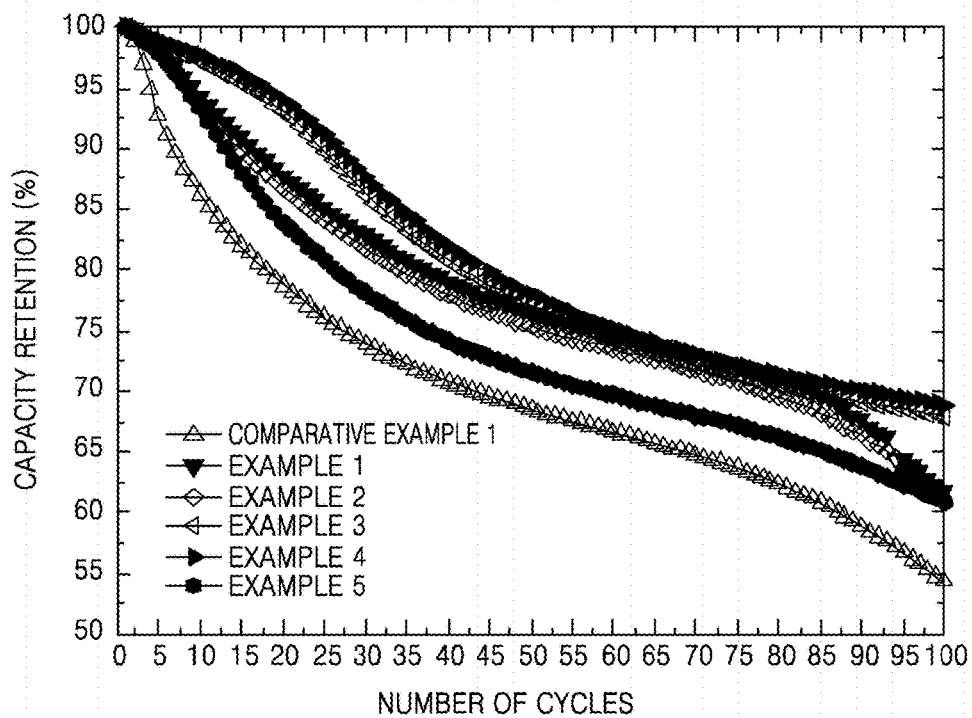
FIG. 6 is a graph of capacity retention (percent, %) versus cycle number of coin half cells prepared according to Examples 1 to 5 and Comparative Example 1 with respect to the number of cycles.
Figure 7:
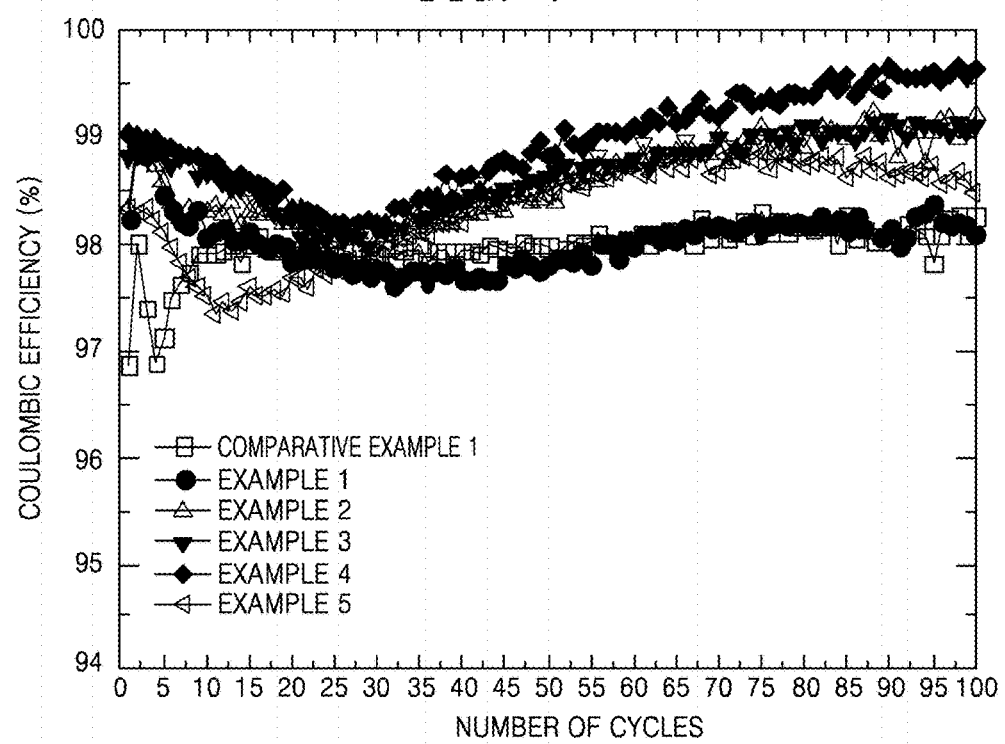
FIG. 7 is a graph of coulombic efficiency (%) versus cycle number of coin half cells prepared according to Examples 1 to 5 and Comparative Example 1.

Cycle lifespans of the coin half cells prepared according to Examples 1 to 5 and Comparative Example 1 are shown in FIGS. 6 and 7. FIG. 6 illustrates capacity retention (lifespan) with respect to the number of cycles, and FIG. 7 illustrates Coulombic efficiency with respect to the number of cycles.

The Coulombic efficiency of FIG. 7 is calculated by Equation 1 below.

Coulombic efficiency (%)=(discharge capacity at $n^{th}$ cycle)/(charge capacity at $n^{th}$ cycle)×100%   Equation 1

In addition, the lifespan of the coin half cells prepared according to Examples 1 to 5 and Comparative Example 1 were evaluated, and the results are shown in Table 2 below.

TABLE 2

|  | Example 1 | Example 2 | Example 3 | Example 4 | Example 5 | Comparative Example 1 |
|---|---|---|---|---|---|---|
| Initial discharge capacity*[1] (mAh/g) | 1086 | 1103 | 1151 | 1113 | 1086 | 1079 |
| Lifespan*[2] (%) (@ 102 times) | 61.7 | 61.1 | 67.8 | 68.8 | 60.3 | 54.3 |

*[1]Initial charge/discharge efficiency = discharge capacity of first cycle/charge capacity of first cycle × 100%
*[2]Lifespan (%) = (discharge capacity when discharging cell at 1.0 C rate at 102$^{nd}$ cycle)/(discharge capacity when discharging cell at 1.0 C rate at third cycle) × 100%

Referring to Table 2 and FIGS. 5 to 7, the coin half cells prepared according to Examples 1 to 5 exhibited greater initial discharge capacities and longer lifespans than the coin half cell prepared according to Comparative Example 1.

Evaluation Example 2

XRD Pattern Analysis of Composite Anode Active Material

Figure 8:
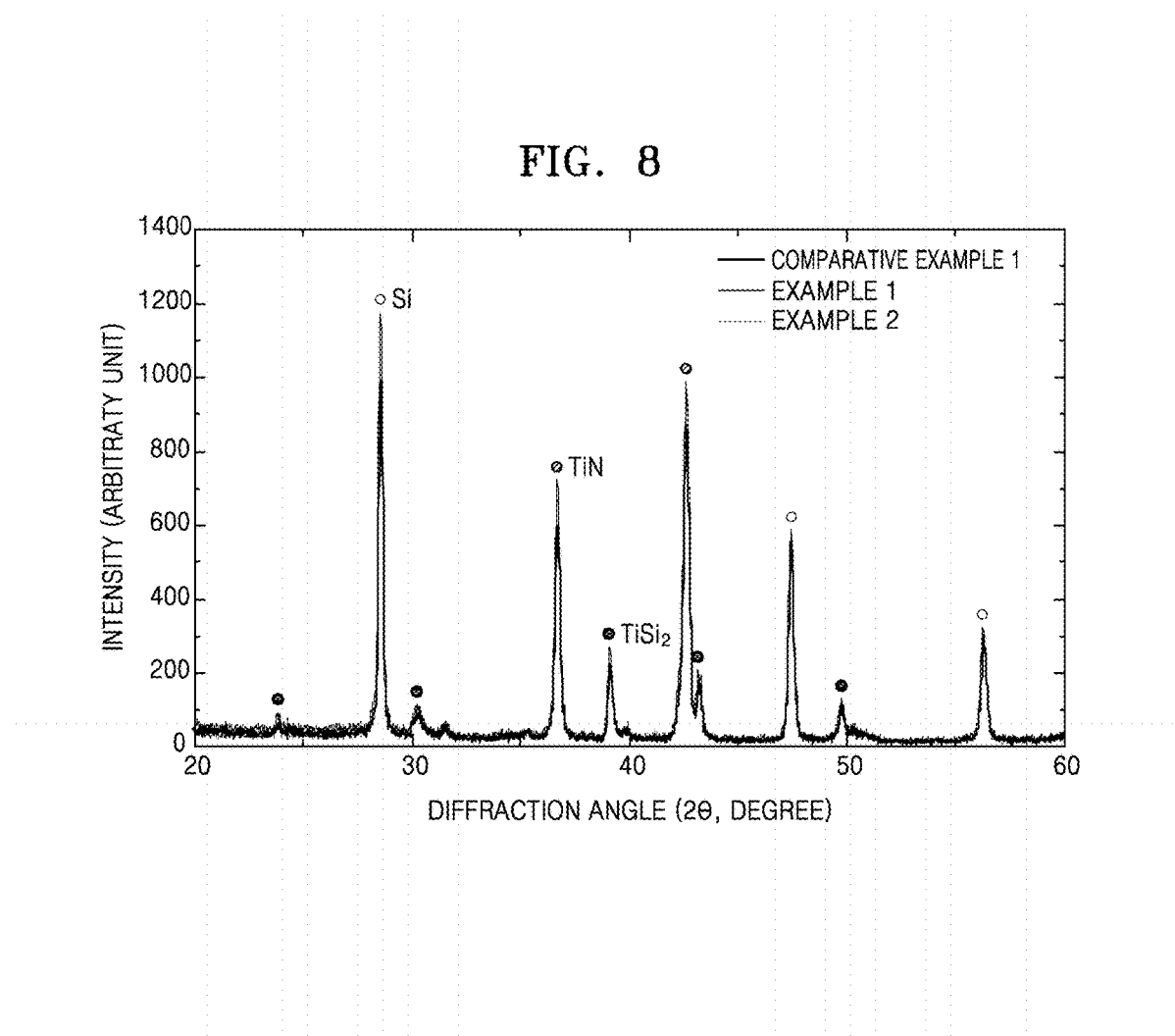
FIG. 8 is a graph of intensity (arbitrary units) versus diffraction angle (2-theta (2θ) degrees) of composite anode active materials prepared according to Examples 1 and 2 and Comparative Example 1.

XRD patterns of the composite anode active materials prepared according to Examples 1 and 2 and Comparative Example 1 were analyzed using an X-ray diffractometer (Rigaku RINT2200HF+ diffractometer using Cu Kα radiation, 1.540598 angstroms, (Å)), and the results are shown in FIG. 8.

Referring to FIG. 8, there was no difference in the crystal structures of the respective composite anode active materials. Thus, it was confirmed that the addition of metal fluoride does not generate impurities in the finished structures of the composite anode active materials and does not change the crystal structure of the produced composite anode active materials. Therefore, it was confirmed that the produced composite anode active materials have high degree of crystallinity.

Evaluation Example 3

Analysis of EDS Mapping Image of Composite Anode Active Material

Figure 9:
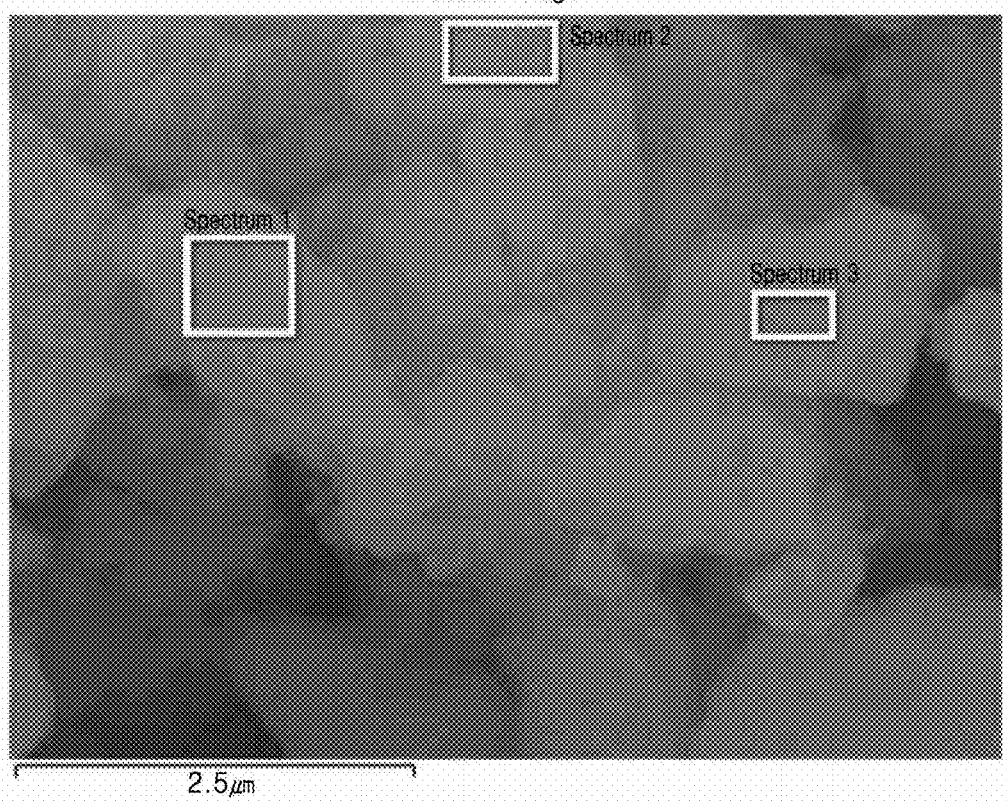
FIG. 9 is an Energy Dispersive X-ray Spectroscopy (EDS) mapping image of a composite anode active material prepared according to Example 1.
Figure 10:
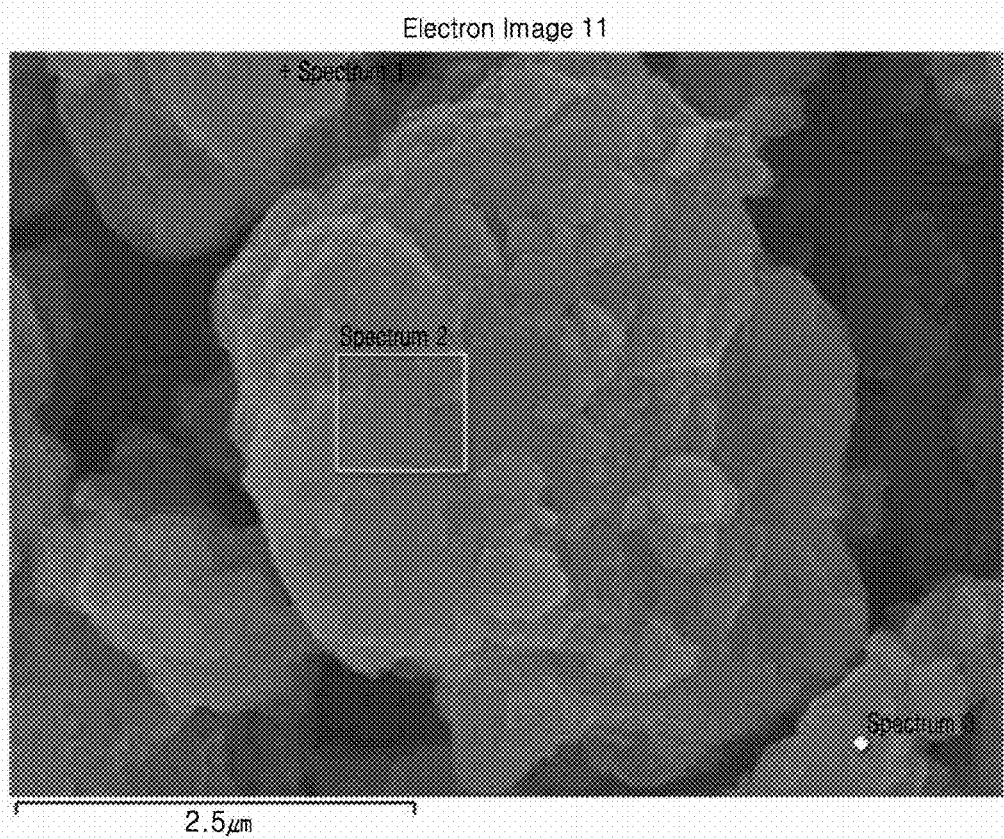
FIG. 10 is an EDS mapping image of a composite anode active material prepared according to Example 2.

Energy Dispersive X-ray Spectroscopy (EDS) mapping images of the composite anode active materials prepared according to Examples 1 and 2 were acquired using an energy dispersion X-ray spectrometer (Bruker, D8 Advance), and the images are shown in FIGS. 9 and 10. FIG. 9 is an EDS mapping image of the composite anode active material prepared according to Example 1. FIG. 10 is an EDS mapping image of the composite anode active material prepared according to Example 2.

Relative contents of elements were measured at three different regions in each EDS mapping image, and average values thereof were calculated and shown in Table 3 below.

TABLE 3

| | Content (Arbitrary Unit) | | | | | |
|---|---|---|---|---|---|---|
| | N | O | F | Al | Si | Ti |
| Example 1 | 17.77 | 12.78 | 0.68 | 1.53 | 39.37 | 27.86 |
| Example 2 | 13.37 | 12.03 | 1.05 | 2.12 | 45.01 | 26.42 |

Referring to Table 3 and FIGS. 9 and 10, the composite anode active materials prepared according to Examples 1 and 2 include aluminum fluoride which was confirmed by the existence of Al and F in the EDS mapping images.

Evaluation Example 4

Analysis of Composite Anode Active Material Through XPS

Figure 11A:
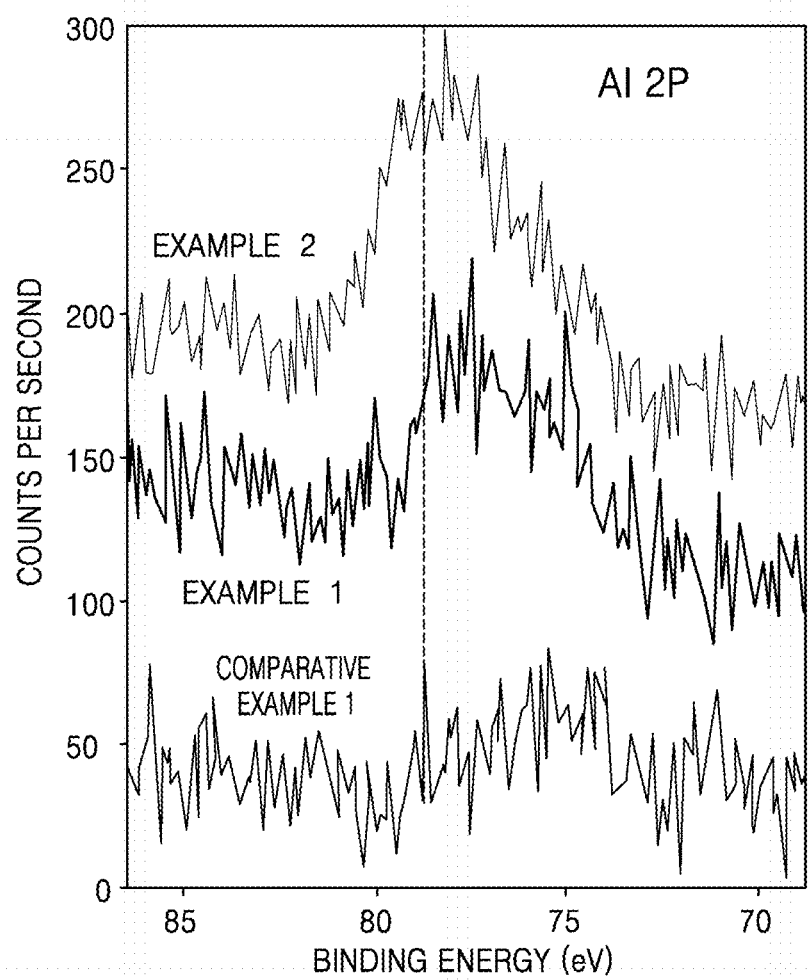
FIG. 11A is a graph of counts per second versus binding energy (electron volts, eV) showing aluminum-2p (Al2p) spectra of composite anode active materials prepared or used in Examples 1 and 2 and Comparative Example 1 and obtained by X-ray photoelectron spectroscopy (XPS)

The composite anode active materials prepared according to Examples 1 and 2 and Comparative Example 1 were analyzed using an X-ray photoelectron spectrometer (Physical Electronics, Quantera II), and the spectra thereof are shown in FIG. 11A (Al2p) and FIG. 11B (F1s), respectively.

Referring to FIGS. 11A and 11B, while the composite anode active materials prepared according to Examples 1 and 2 include aluminum fluoride, which was confirmed by the existence of Al2p peaks and F1s peaks of the XPS spectra, the composite anode active material prepared according to Comparative Example 1 does not include aluminum fluoride.

Since the composite anode active material according to an embodiment includes a stable composite coating layer, the lithium secondary battery may have excellent lifespan characteristics by preventing reduction in the lifespan caused by continuous formation of SEI layers during repeated charging and discharging.

It should be understood that embodiments described herein are to be considered in a descriptive sense only and not for purposes of limitation. Descriptions of features or aspects within each embodiment are to be considered as available for other similar features or aspects in other embodiments.

While one or more embodiments have been described with reference to the figures, it will be understood by those of ordinary skill in the art that various changes in form and details may be made herein without departing from the spirit and scope as defined by the following claims.

What is claimed is:

1. A composite anode active material comprising:
    a silicon anode active material comprising silicon;
    a metal nitride; and
    a metal fluoride,
    wherein the metal nitride and the metal fluoride are each independently disposed directly on at least one surface of the silicon anode active material.

2. The composite anode active material of claim 1, wherein the silicon anode active material comprises
    a metal silicide core, which comprises a metal silicide, and
    a silicon shell, which comprises silicon.

3. The composite anode active material of claim 2, wherein the metal nitride and the metal silicide comprise a same metal.

4. The composite anode active material of claim 2, wherein the metal silicide comprises Ti, V, Cu, Zn, Mo, Ni, Al, Ca, Mg, Fe, Cr, an alloy of at least two thereof, or a combination thereof.

5. The composite anode active material of claim 2, wherein a content of the metal nitride in the composite anode active material is about 0.5 mole or less, based on 1 mole of the silicon contained in the silicon shell.

6. The composite anode active material of claim 2, wherein a content of the metal silicide in the composite anode active material is about 0.5 mole or less, based on 1 mole of silicon contained in the silicon shell.

7. The composite anode active material of claim 2, wherein the metal silicide is $TiSi_x$ wherein $0<x\leq2$.

8. The composite anode active material of claim 1, wherein the silicon anode active material comprises a silicon core without a shell, wherein the silicon core comprises silicon.

9. The composite anode active material of claim 8, wherein a content of the metal nitride in the composite anode active material is about 0.5 mole or less, based on 1 mole of silicon contained in the silicon core.

10. The composite anode active material of claim 1, wherein the metal nitride comprises Ti, V, Cu, Zn, Mo, Ni, Al, Ca, Mg, Fe, Cr, an alloy of at least two thereof, or a combination thereof.

11. The composite anode active material of claim 1, wherein the metal nitride is $TiO_xN_y$, wherein $0\leq x<1$ and $y=1-x$.

12. The composite anode active material of claim 1, wherein the metal fluoride comprises Al, Li, Sb, Ba, Bi, B, Ca, Co, Cu, Ge, Fe, La, Mg, Mn, Mo, Ni, Si, Ag, Na, Sr, Sn, Ti, W, Y, Zn, Zr, an alloy of at least two thereof, or a combination thereof.

13. The composite anode active material of claim 1, wherein the metal fluoride comprises $AlF_xO_y$, wherein $0<x\leq3$ and $y=3-x$, $LiF_xO_y$, wherein $0<x\leq1$ and $y=1-x$, or a combination thereof.

14. The composite anode active material of claim 1, wherein a content of the metal fluoride is in the range of about 1 to about 70 parts by weight, based on 100 parts by weight of a total weight of the composite anode active material.

15. An anode comprising the composite anode active material according to claim 1.

16. The anode of claim 15, further comprising an additional anode active material.

17. A lithium secondary battery comprising the anode according to claim 15.

18. A method of preparing a composite anode active material, the method comprising:
    milling a metal silicide;
    heat-treating the milled metal silicide in a nitrogen atmosphere to form a heat-treated metal silicide comprising a metal nitride on a surface thereof; and
    contacting the heat-treated metal silicide with a metal fluoride to dispose the metal fluoride directly on a surface of the heat-treated metal silicide and to form a coating comprising the metal fluoride disposed directly on the surface of the heat-treated metal silicide to prepare the composite anode active material.

19. The method of claim 18, wherein the composite anode active material comprises a core comprising the metal silicide, and
    wherein the metal nitride and the metal fluoride are each independently disposed on a surface of the core.

20. The method of claim 18, wherein the composite anode active material comprises a core and a shell,
    wherein the core comprises the metal silicide,
    wherein the shell comprises silicon, and
    wherein the metal nitride and the metal fluoride are each independently disposed on a surface of the active material.

21. The method of claim 18, wherein the contacting comprises milling a mixture of the heat-treated metal silicide and the metal fluoride.

22. The method of claim 18, wherein the contacting comprises combining the heat-treated metal silicide with a solution comprising the metal fluoride.

23. The method of claim 18, wherein the heat-treating is performed at a temperature of about 800° C. to about 1200° C.

* * * * *